Dec. 22, 1925.

G. W. CAMPBELL 1,566,270

TYPEWRITING MACHINE

Filed Oct. 27, 1921 3 Sheets-Sheet 1

Inventor:
George W Campbell
by B C Stickney
Attorney

Dec. 22, 1925.

G. W. CAMPBELL

TYPEWRITING MACHINE

Filed Oct. 27, 1921

Inventor:
George W. Campbell
by B.C. Stickney
Attorney

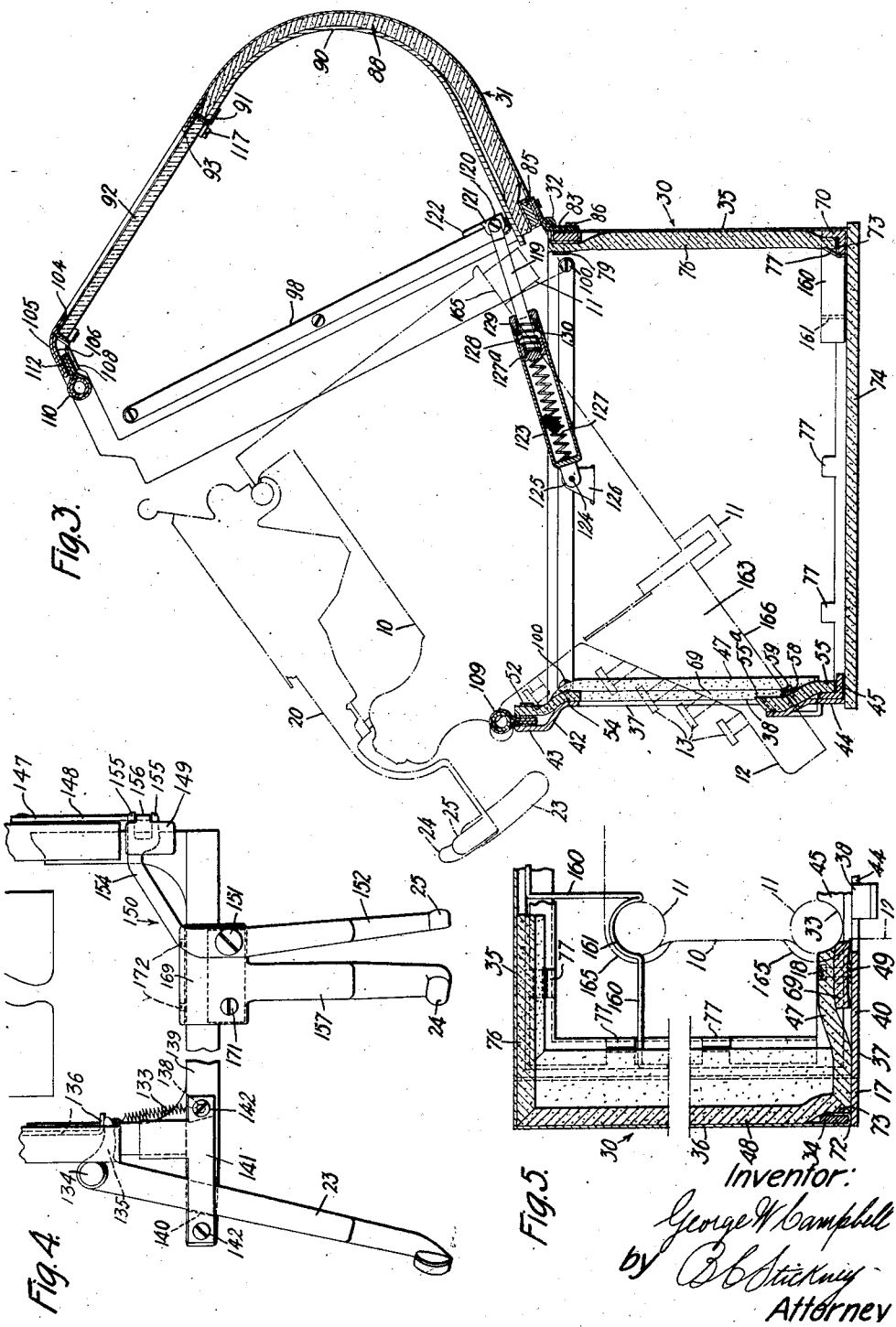

Patented Dec. 22, 1925.

1,566,270

UNITED STATES PATENT OFFICE.

GEORGE W. CAMPBELL, OF HARTFORD, CONNECTICUT, ASSIGNOR TO UNDERWOOD TYPEWRITER COMPANY, OF NEW YORK, N. Y., A CORPORATION OF DELAWARE.

TYPEWRITING MACHINE.

Application filed October 27, 1921. Serial No. 510,725.

*To all whom it may concern:*

Be it known that I, GEORGE W. CAMPBELL, a citizen of the United States, residing in Hartford, in the county of Hartford and State of Connecticut, have invented certain new and useful Improvements in Typewriting Machines, of which the following is a specification.

The present invention relates to sound-deadening casings for typewriting machines; that is to say, to casings in which the machine may be operated with a minimum of noise. The invention also relates to features of the machine itself, whereby it is highly adapted to successful operation within the casing.

A feature of the invention is the provision of means whereby a sound-deadening lining or lining-pieces may be effectively secured to the casing shell without the use of extra parts for this purpose. This feature of the invention comprises, in part, fingers stamped out of the sheet material of the casing and turned against the lining-pieces. In part this feature of the invention consists in a cutting or mitering of the abutting edges of the lining-pieces at the corners of the casing, so that one piece serves to hold the other.

Another feature of the invention is the provision of means whereby the machine may be inserted into the casing from the top, and its keyboard brought forward through an opening in the front of the casing, and the casing nevertheless be made practically sound-proof without involving the use of detachable front pieces for the casing. This feature of the invention consists in the provision of an opening in the front of the casing, large enough to permit the keyboard section to be first inserted therethrough in tilted position and then swung around therein to horizontal position, and in the provision of a detachable plate on the front of the machine itself, so that, when the front of the machine is set against the inside face of the casing front plate, the detachable plate on the machine will close that part of the opening in the casing front plate which is in excess of what is actually occupied by the keyboard section of the machine when the latter is finally in place.

Another feature of this invention is the provision of a readily detachable cushion-piece forming the upper wall of a longitudinal slot in the casing, along which slot the operating levers on the carriage move with the carriage as the machine is operated; and in means whereby this cushion-piece may be utilized to hold a transparent window pane in place in the casing shell.

A feature of the invention is the provision of a sound-deadening bottom or base-piece forming an integral part of the casing; and in means whereby the machine may be supported on the casing wall, and the bottom of the casing be relieved of the weight thereof, when the casing is lifted with the machine therein.

Another feature of the invention is the provision of means for determining the true position of the machine in the casing, with the front plate of the machine against the casing front wall; and in the use of such means as a support for the machine when the casing is lifted.

A feature of the invention resides in a spring device for assisting in opening the cover of the casing, which spring is concealed to prevent injury thereto; and in the provision of a buffer in connection with this spring device to avoid shocks and strains on the casing in the cover-opening operation.

Another feature of the invention is the provision of an auxiliary spring for the line-space lever to meet the friction which the cushions, along which that lever travels, offer to the return of the lever to normal position after operation thereof.

A feature of the invention is the provision of an auxiliary lever on the carriage but operable from the outside of the casing, for actuating the carriage-release-lever within the casing; and in means whereby this auxiliary lever may be detachable, and may be carried by the carriage-return-arm, far more easily effecting the carriage release and return operations.

Other features and advantages will hereinafter appear.

In the accompanying drawings,

Figure 3 is a view in side elevation, showing the manner in which the machine is inserted in the casing.

Figure 4 is a top plan broken view, showing the operating arms and levers on the carriage.

Figure 5 is a detail plan view in cross-section on the line 5—5 of Figure 2, showing the means by which the machine is positioned, and showing certain other features.

Figure 1:
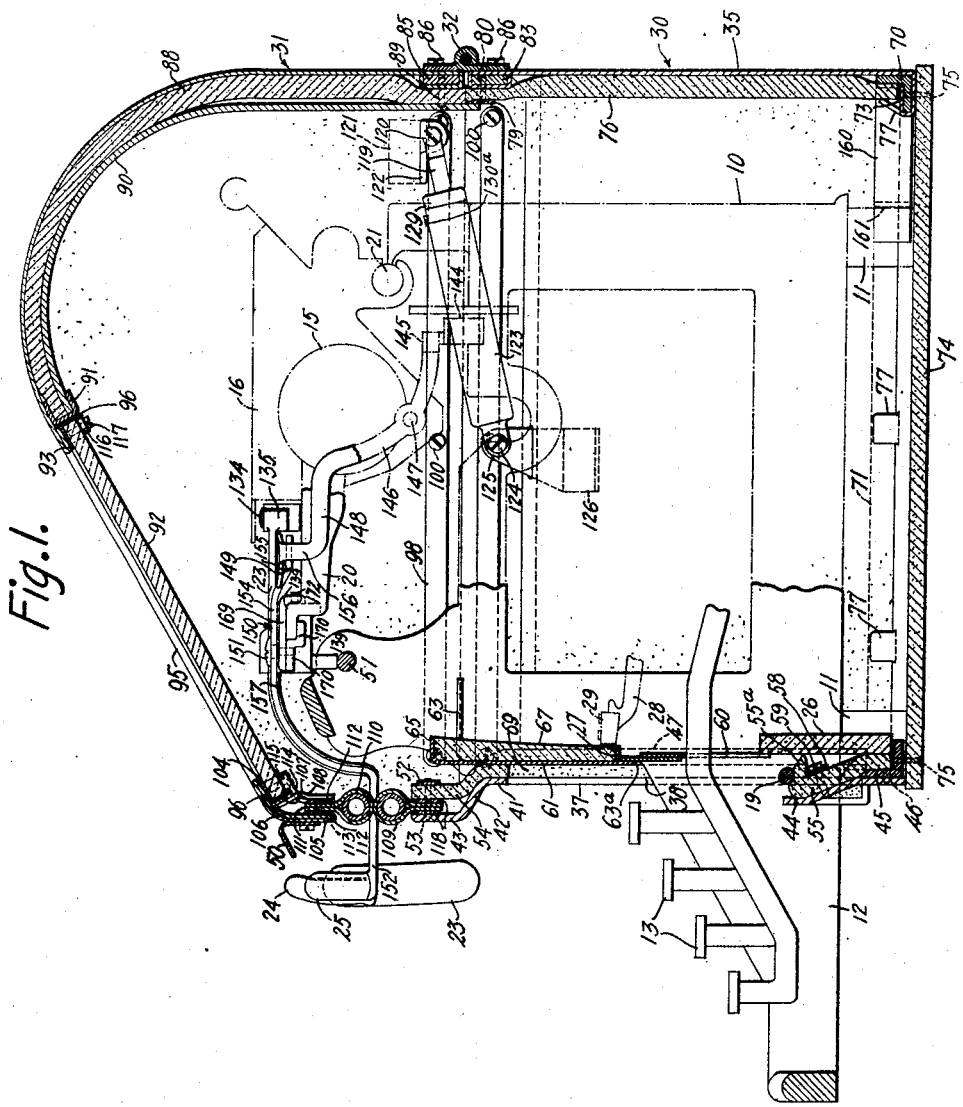
Figure 1 is a view in cross-sectional side elevation of the machine in operative position in the casing.

The Underwood Standard typewriting machine comprises a main frame 10, supported by feet 11 upon a base, and is provided with a forward extension 12, in which are positioned banks of keys 13, for operating type-bars 28, to cause types 29 carried thereby to print against a platen 15, journaled in the end walls 16 of a platen-frame. The platen-frame forms part of a carriage 20, mounted for letter-feeding movement upon a front rail 51 and a rear rail 21, fixed to the main frame 10. The carriage is provided with various forwardly-extending levers or arms, such as a line-space-lever 23, a carriage-return-arm 24, and a carriage-release-lever 25.

Figure 2:
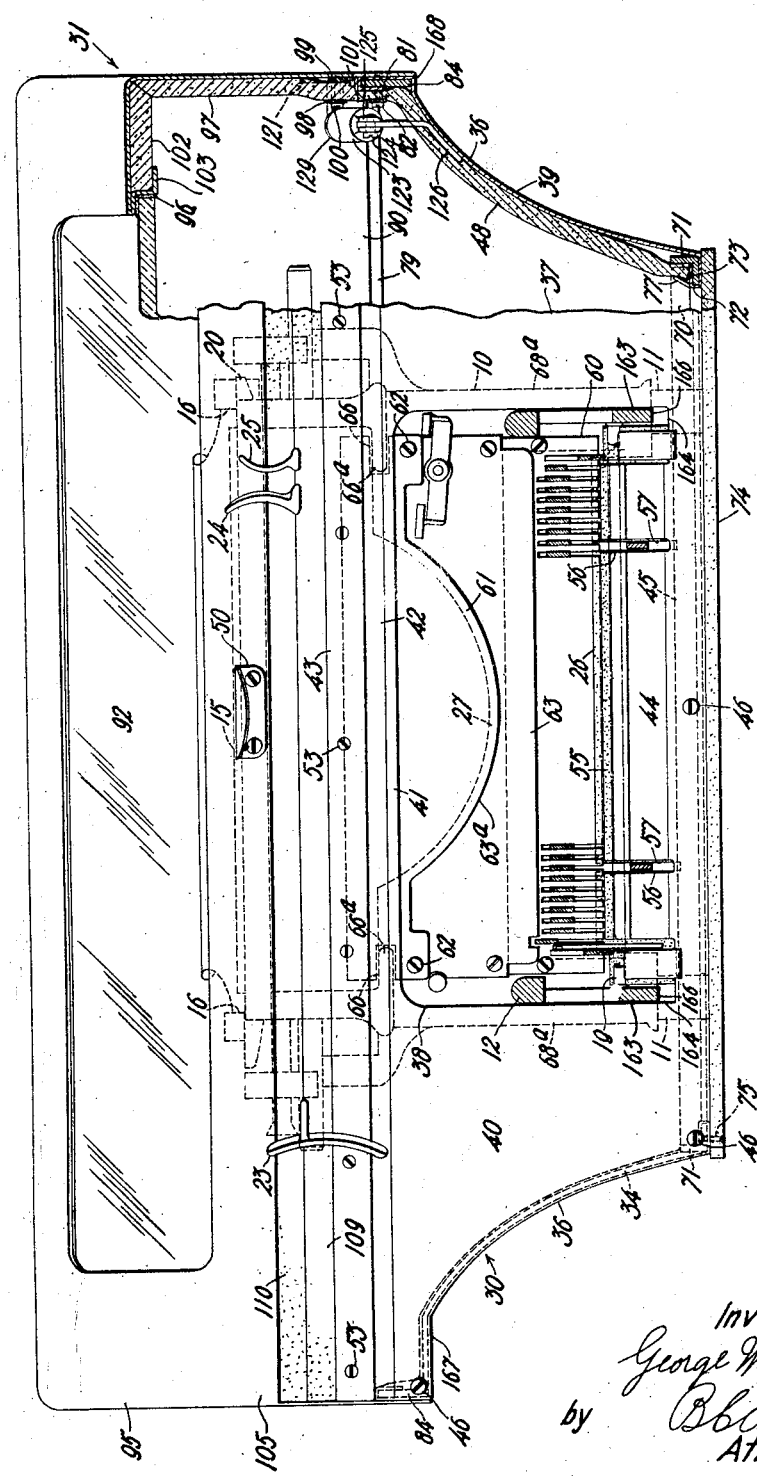
Figure 2 is a front view, partly in cross-section on the line 2—2 of Figure 1.

For deadening the sounds occurring in the typing operation, there is provided a sound-deadening casing or hood, comprising a body-part 30, and a cover-part 31, hinged to the body-part at 32. The body-part comprises a rear wall 35, side walls 36 and a front wall 37. To permit of operation of the type-keys from outside of the casing, the front wall 37 has a substantially rectangular opening 38, through which passes the forward extension 12 of the machine, so as to expose the banks of keys 13. To provide for letter-feed movement of the carriage within the casing, and to allow room for the paper which hangs down at the rear of the paper-shelf and travels with the carriage, the body-portion of the casing is somewhat wider at its base than is the machine, and, as shown in Figure 2, is flared upwardly and laterally at 39 to the full width of the cover-portion; in which latter, the carriage has its throw between extreme positions. To each side of the opening 38 in the front wall of the body-portion 30 of the casing, there is therefore presented a wall-portion 40 of somewhat triangular shape; and, connecting the front wall-portions 40 above the opening 38, the front wall 37 is in the form of a strip 41, which is flared forwardly from the vertical, at 42, and is then turned vertically upward, as at 43. Below the opening 38 in the body front wall, the wall also takes the form of a horizontal strip 44, which is likewise flared forwardly just below the base of the machine.

The forward lower edge of the body-portion of the casing is re-enforced by an angle-piece 45 secured to the casing by screws 46. For each of the front casing-portions 40, there is provided a lining-piece 47 of felt or other sound-deadening material. These lining-pieces 47 conform to the shape of the parts 40, and are mitered at their curved lateral edges 17, see Figure 5, to fit with a similar mitering on lining-pieces 48 for the sides of the body-portion. The forward mitered edges of the lining-pieces 48, therefore, hold the front felt pieces 47 at their outer edges. For holding the lining-pieces 47 at the edges of the opening 38, there is provided a vertical metal strip 49, see Figure 5, on the inside of each of the parts 40, which strips are soldered, brazed or attached to the parts 40 in any suitable manner, and have threaded holes therein to receive screws 18 which pass through the lining-pieces 47 from the inside. These strips 49 also serve as re-enforcements for the front plate at the opening 38. For holding the lining-pieces 47 to the casing front portions 40 at their upper edges, there is provided on the interior of the front wall 37 of the casing-body, a strip 52, see Figure 1, which extends over the opening 38 entirely across the front of the casing-body, and between which and the front of the casing-body the lining-pieces 47 are set. Screws 53 pass through the top edge of the front of the casing-body and through the linings 47, finally to be threaded into holes in the metal strip 52. Also held, in like manner, by other screws 53, between the strip 52 and the front of the casing, over the opening 38, is a felt strip 54.

Below the opening 38 the front of the casing is lined by a strip of felt 55, the lower edge of which overlies the horizontal portion of the re-enforcing angle-piece 45, and the upper edge of which normally projects slightly above the upper edge of the front casing-strip 44 below the opening 38. To permit operation of the space-bar-supporting levers, and certain other levers, and to receive the side frame-pieces of the machine, the front piece 44 of the casing below the opening 38 is slotted, as at 56; and the lining-piece 55, therefore, has slots or cuts 57 in registration with the slots 56. For attaching the strip 55 to the front casing-portion 44, there are provided a series of aligned metal strips 58 on the inside of the lining-piece 55; and screws 59 pass through the metal strips 58, from the inside, and through the lining-strip 55, to be threaded into the casing front piece 44. It is because of the cuts or slots 56 and 57 that there are the series of aligned lining-supporting strips 58, instead of a single strip 58. The upper edge of the front lower lining-strip 55, is tapered off as at 55ª, so as to be flexible and resilient; and, when the machine is in place, this flexible edge 55ª is forced down by the shift-lock-release-rod 19 of the typewriting machine, as shown in Figure 1, and prevents rattling of that rod. A sound-deadening lining-strip 26 of felt is carried by the machine between the front feet thereof. This strip 26 extends up from the base to a point where it slightly overlaps the comb-plate 60, thus cutting off the emission of sound from below the keyboard.

In the present invention, the machine is to be placeable in, and removable from, the casing without necessitating the removal of any part of the front of the casing-body. It is, for this reason, that the front of the casing-body, over the forward extension 12 of the machine, and in front of the type-bar-basket, is not provided with a depending arcuate portion to conform to the usual arcuate chamber defined at the front of the machine by the type-bar-basket. If such an arcuate casing-piece depended from the front casing-strip 41 over the opening 38, it would render somewhat difficult the removal and insertion of the machine. Nevertheless, if noise is to be shut off, the opening, which would otherwise be formed between the lower edge of the front casing top strip 41 and the arcuate opening in the front plate of the machine, should be closed. This closure is here effected by a plate 61, which is removably attached to the front plate of the machine itself. Screws 62, which assist in holding the front plate 63 of the machine to the frame thereof, may be used to secure the removable plate 61 in place. The plate 61 has an arcuate lower edge 63ᵃ, which, when the plate 61 is in place, overlaps the upper arcuate edge of the front plate 27 of the machine. The upper edge of the plate 61 has a horizontal flange 65 in substantial alignment with the upper edge of the machine front plate. When the machine is in place in the casing, the upper part of the removable plate 61 on the machine lies against the inside of the felt lining-strip 54 over the opening 38 in the casing front plate. The plate 61 is shown as notched at 66 at its upper ends to register with ribs 66ᵃ which are found on the frame of the Underwood Standard typewriter. A strip of felt 67, glued or otherwise attached to the inside of the removable plate 61, serves as a sound-proof lining therefor. This felt piece 67 is of substantially the shape of the plate 61, and, at its lower arcuate edge, is tapered off to clear the type-blocks 29 on the forward end of the type-bars 28. The curl or flange 65 on the upper edge of the plate 61 is to provide an abutment and covering for the top edge of its lining-piece 67; and this curl or flange in the plate 61 also serves as a re-enforcement or strengthening means therefor.

To provide a snug sound-proof cushion-abutment for the front corner-posts 68ᵃ of the typewriting machine, when the same is in place in the casing, see Figure 5, an extra thickness of lining is desirable at the side edges of the opening 38. This extra thickness is effected by the placement of two narrow strips of lining-material 69 between the lining-pieces 47 and the front casing-body-portions 40. The front lower re-enforcing angle-bar 45 is recessed at 33 to receive and position the front feet 11 of the machine, and to permit the machine to be brought forward in the casing so that its front plate may bear upon the casing front plate.

The rear lower edge of the casing-body is re-enforced by an angle-piece 70, which runs the entire length thereof; and the side lower edges of the casing-body are re-enforced by similar angle-pieces 71, which run from the front to the rear edges of the casing. Bars 34 re-enforce the forward side corners of the casing. As shown in Figures 1 and 2, the sheet-metal, forming the casing, is bent around the re-enforcing bars 70, 71 and 34, as at 72, to provide a flange 73 which securely hold the bars to the frame. A base-piece of sound-proof material 74 is secured to the angle-bars 45, 70 and 71, or to the casing-metal where the same is turned around the angle-bars, by means of screws 75. The rear wall 35 of the casing-body is preferably provided with a one-piece lining 76; and, as heretofore stated, the end walls 36 of the casing-body are provided with lining-members 48, which are also preferably one-piece members. It has been noted that the side lining-members 48 are mitered where they engage the front lining-members, so that the front and side lining-members hold each other in place where their edges come together. The side lining-members 48 and the rear lining-members 76 are likewise mitered at their abutting edges for the same purpose. Thus, these lining-members, except at their upper and lower edges, hold each other in place.

For holding the lower edges of the end of side lining-members 48 and of the rear lining-member 76, fingers 77 are struck out of the flanges 73 formed in the casing-sheet-metal over the angle-irons 70 and 71; and, as shown in the drawings, these fingers 77 are bent back from the ends of the horizontal members of the angle-irons, so as to bear against the lower edges of the end and rear lining-pieces of the casing-body. Except where the casing-flanges 73 are cut to form the fingers 77, the rear and side lining-members rest upon the flanges 73. A metal strip 79 extends along the top edge of the rear lining-member 76 on the inner face thereof; and screws 80, passing through the strip 79 and through the lining-member 76, thread into the sheet-metal of the casing to hold the rear lining-member 76 at its upper edge. Similar strips of metal 81 and screws 82 hold the top edges of the side or end lining-pieces to the casing-body.

The rear, and side, upper, edges of the casing-body are re-enforced by bars 83 and 84, respectively; and, as shown in the drawings, the sheet-metal of the casing is bent over and down around these re-enforcing bars for attachment thereto. The lower rear edge of the casing-cover-portion 31 is also provided with a re-enforcing bar 85, around which the sheet-metal of the casing is turned in the same manner and for the same purpose. The hinges 32 are secured to the casing-body and cover by means of screws 86, which pass through the wings of the hinges and through the sheet-metal of the casing, and are threaded into the re-enforcing bars 83 and 85.

The casing-cover, at its rear, and for a distance over the top thereof, has a sound-proof lining-member 88 which is held in place at its lower edge by screws 89 which pass therethrough and which thread into the re-enforcing bar 85. The cover-portion, at the rear thereof, and where it reaches over the typewriter-carriage, is provided with a smooth interior facing-piece 90, so that the paper on the typewriter-carriage may not be caught and twisted or crumpled by contact with the felt. The screws 89, which serve to hold the lining-member 88, at the lower edge thereof, also serve to hold the lower edge of the facing-piece 90. The facing-piece 90 extends slightly below the top edge of the body-portion to prevent the paper from being caught between the body and cover. A U-shaped metal strip 91, in the top of the casing-cover, see Figure 1, clamps and holds the upper forward ends of the cover-lining and facing-pieces 88 and 90. This clamping-strip 91 extends entirely across the top of the cover and is suitably secured to the latter.

In the cover, there is a transparent window-pane 92. At the top edge of the window, the sheet-metal of the cover is crimped to form a supporting ledge 93 for the window-glass. The cover is continued downward and forward at 95, see Figure 2, on both sides of the window, and is similarly crimped at the side and front edges of the window, to complete the supporting ledge or setting for the glass. A strip 96 of leather or other shock-absorbing material may be glued or set in between the glass and the window-ledge. The ends or sides of the cover are provided with sound-deadening linings 97, which may be continuous with the lining-member 88, except where cut away for shaping purposes. The lower edges of the cover side-lining-pieces 97 are held in place by metal strips 98, which extend therealong from near the front of the casing-cover to the rear thereof, and which lie against the lining-pieces 97 on the inside face thereof. Other strips 99, parallel to the strips 98, are soldered, brazed or otherwise secured to the inner faces of the cover side members. Screws 100 pass through strips 98, through the lining-pieces 97 and thread into the strips 99; thus holding the edges of the lining-pieces 97. Ears 101, projecting inwardly from the casing, or from the strips 99 near the front of the casing, may serve as stops to engage the upper edges of the side walls 36 and support the cover-part when in closed position. To render sound-proof the casing-cover at the portions 95 thereof at the sides of the window, the side lining-pieces 97 are provided with ears or flaps 102, which are turned over from the upper parts of the pieces 97 to follow the line of the cover to the sides of the window. The edges of these ears or flaps, where they abut the window, are held in place by a crimp or flange 103 in the sheet-metal where it forms the window-seat.

At the lower front edge of the cover-top, the sheet-metal is not only folded or crimped over, as at 104, to form the window-seat, but is also brought down, to form a front cross-piece 105, folded up upon itself, as at 106. To the offset or flange 107, at the window-seat front, are attached clips 108, between which and the turned-over part 106, the upper of two cushions is adapted to be set. These cushions are shown as tubes 109 of rubber or other yieldable, flexible material, each supported in the fold of a strip 110 of flexible material, such as felt, the ends 111 of the strips 110 being brought together between two metal strips 112. Screws 113 passing through the metal strips 112 and the ends of the felt cushion-strips 110 hold the parts of the cushion together. The upper and lower cushions 109 are normally in contact to prevent escape of sound except where various operating levers and arms project between the cushions from the inside to the outside of the casing; the cushions being resilient to permit of actuation, and movement with the carriage, of these various levers and operating arms.

In positioning the upper cushion, the part thereof formed by the rails or strips 112 is inserted between the clips 108 and the front piece 106 of the cover-top. The clips 108 may have a slight spring to cause the upper cushion to be held in place. Preferably, however, for holding the upper cushion, in addition to the clips 108, there is, soldered or otherwise secured to the inside rail 112 of the upper cushion, near each end thereof, an ear 114, through which passes a screw 115, which threads into the sheet-metal of the casing-top or into a lug, brazed or otherwise attached to the sheet-metal at or near the corner of the window-seat. In the present invention, the ears 114 are so shaped and positioned on the cushion-rail as to overlap the edge of the window-glass; so that, when the window is in place, and when the top cushion has likewise been secured in place, the ears 114 serve to support the window at its lower edge. The window at its upper edge is supported by fingers 116 secured by screws 117 to the cover-top, or to lugs brazed thereon, at the upper corners of the window-seat. The lower cushion is positioned with its metal felt-retaining strips or rails 118 between the top 43 of the front plate and the upper edge of the front lining-members 54 and 47. The screws 53, which hold the upper edges of the front lining-members, pass through the felt-retaining strips 112 of the cushion, and thereby held the lower cushion in place.

The cover is held open, and is assisted in its opening movement, see Figure 3, by two devices, one at each side of the casing, and each comprising a rod 119 pivoted at 120 to a bracket 121, secured to the inside of the cover and plate, the brackets 121 having offsets 122 which pass through cuts in the cover lining-members 97. The rods 119 slide in cylinders 123, which, see Figures 2 and 3, have ears 125 pivoted at 124 to brackets 126. The brackets 126 are secured to the side plates of the casing-body and project through cuts in the end lining-members 48 of the casing-body. Within the cylinders 123, the rods 119 are provided with collars or pistons 127$^a$, against each of which bears the end of a coiled spring 127; the other end of which spring has bearing upon the lower forward end of the cylinder. When the cover is closed, the spring 127 is compressed. As the cover is lifted, the pressure of the spring on the pistons 127$^a$ tends to throw the cover upward and backward; and, therefore, to assist in the quick opening thereof. As a buffer, and to prevent strains and shocks on the parts by too violent an opening of the heavy cover, there is also, within each of the cylinders 123, a spring 128. The buffer springs 128 lie between the pistons 127$^a$ and caps 129 on the upper ear ends of the cylinders. As shown in Figure 3, the caps 129 are shouldered to rest against the ends of the cylinders and have annular flanges 130 which fit within the cylinders. Set-screws 130$^a$ hold the caps in place on the cylinders. The annular flanges on the caps are of such size as to provide a chamber between the same and the plungers or rods 119, for the buffer springs 128; and the pistons 127$^a$ are also preferably cup-shaped to receive the buffer springs 128. As contradistinguished from the lifting springs 127, the buffer springs 128 are not under compression when the cover is closed. As the rods or plungers 119 move backward with the pistons 127$^a$ in the opening of the cover, however, the springs 128 are compressed, and thus act as buffers. When the cover reaches the position shown at Figure 3, it is poised upon its hinge 32, and the pistons 127$^a$ act as stops to prevent substantial movement of the cover beyond this position. The cover may be opened and closed by means of a handle 50, screwed to the front piece 105 thereof, near the projecting typewriter keyboard.

In the Underwood Standard typewriting machine and in other typewriting machines, the line-space-pawl and operating lever therefor are returned to normal position after each line-space movement by a spring, ordinarily suitable for such purpose. Where, however, the line-space-lever, as in the present invention, is to project through the casing, and is to be moved between cushions 109, which resiliently bear thereon, it may be desirable to provide other than the means heretofore used, for returning the line-space-lever after actuation thereof. In other words, it may be desirable to provide extra power, for the return-throw of the line-space-lever, to overcome the friction exerted on that lever by the opposed resilient cushions 109. Accordingly, in the present invention, see Figure 4, there is provided an auxiliary spring 133 to assist the spring (not shown) which is ordinarily used to return the line-space-lever. In the Underwood machine, the line-space-lever 23 is, in effect, a bell-crank-lever, pivoted at 134 to the carriage-frame, one arm 135 of which bears upon the end of a slide 136 which carries the line-space-pawl. The spring 133 is shown as secured at one end to this slide-operating arm 135 and at its other end to a lug 138 on the front rail 139 of the carriage-frame. A lug 140 on the same rail of the carriage-frame limits the return-throw of the line-space-lever; and a plate 141 may be secured to the lugs 138 and 140, as by means of screws 142, to overlie the line-space-lever.

In the Underwood Standard typewriting machine, the carriage is controlled by a pinion 144 which meshes with a rack 145 on the carriage. The rack 145 is movable into and out of engagement with its driving pinion 144 and lifted out of engagement with the pinion 144 when the carriage is to be relased. A lever 146, pivoted at 147, is connected with the rack 145, so that, when the forward arm 148 of the lever 146 is depressed, the carriage is released. Ordinarily, the arm 148 carries a finger-piece 149 for actuating the lever 146. It will be noted, see Figure 1, that the forward arm 148 of the carriage-release-lever has a downward-and-forward movement. It will also be noted that in the drawings the finger-piece 149 is shown as quite within the casing.

In order that the carriage-release lever 146 may be operated from without the casing, there is provided, in the present invention, see Figures 1 and 4, another lever 150 which may itself be termed a carriagerelease-lever, and which may be pivoted, as at 151, indirectly to the front carriage-rail 139. The forward arm 152 of the lever 150 is bent downward and is then extended forwardly between the cushions 109; and, at its outer end, carries the finger-piece 25. The lever 150 has a lateral swing on its vertical pivot 151. The inner arm 154 of the lever 150 is forked, as at 155, to embrace the vertically-disposed stem or finger-piece-portion 156 of the lever 146. The pivot 151 of the lever 150 is to the left of the lever 146, so that movement of the finger-piece 25 to the left causes the arm 148 of the lever 146 to be thrown down, and the rack 145 to be lifted out of engagement with the pinion 144, thus releasing the carriage. The fork 155 of the lever 150 allows for the play necessary to permit the lateral movement of the lever 150 to be translated into the vertical movement of the lever 146.

In the present invention, the carriage-release-lever 150 is not pivoted directly upon the typewriter-carriage, but preferably on an arm 157, which carries the hand-hold or finger-piece 24, for returning the carriage. The carriage-return-arm 157 is itself secured to the front carriage-rail 139; and, like the carriage-release-lever 150, is bent downward in front of the rail or bar 51 on the framework, and then carried forwardly and outwardly to the casing, out of which they all project between the cushions 109. The finger-pieces 24 and 25 on the carriage-return-arm and the carriage-release-lever are adjacent one another, so that the carriage-return-arm may be engaged by the thumb, and the release-lever by the forefinger, to pinch the release-lever toward the carriage-return-arm; thus enabling the operator to release the carriage with his forefinger, and to control the return-movement of the carriage, while the same is thus held released, by the engagement of his thumb with the carriage-return arm. The carriage-release-lever 150 has a great individual movement in the cushion-sealed slot 109; but, owing to its vertical pivoting, this movement of the lever is longitudinal of the slot, and hence its movement is free. By simply removing the screw 151, the auxiliary carriage-release-lever 150 may be detached; after which the carriage-release may be effected in the usual way by the finger-piece 149, when the casing is not used. The carriage-return-arm 157 is also of a special design for use with a casing; and it, also, may be removed at will. The plate 169, on which the arm 157 is formed, is held to the rail 139, see Figure 1, by a tongue-piece 170 which is held by screws 151 and 171 to the plate 169, and which is offset to engage the bottom of the rail 139. Set-screws 172 also assist in holding plate 169 to the rail 139. By removing the screws 151 and 171, the plate 169, arm 157 and lever 150 may all be removed.

Secured to the rear and side walls of the casing-body, see Figure 5, are two brackets 160, in the form of sheet-metal strips passing through cuts in the lining-members 76 and 48. These strips are set vertically, and each has a pocket 161 therein to receive one of the rear feet 11 of the typewriting machine. The typewriting machine is placed in the casing in the manner indicated in Fig. 3, that is to say, it is tipped, so that the front extension 12 thereof may be passed through the opening 38 in the front wall of the casing-body, and is thereafter swung downwardly, the extension 12 being simultaneously swung forwardly until the rear feet 11 of the typewriter enter the pockets 161 in the brackets 160, and the front feet 11 the recesses 33 in the front angle-bar 45. The pockets 161 are so positioned as to cause the front plate of the machine to abut the inner face of the casing front plate. In being thus placed in the casing, the side plates 163 of the machine are dropped into the slots 164 in that portion 44 of the front wall of the casing which underlies the opening 38. The weight of the machine, when the casing is on a stand, is carried by the front and rear feet. If, when the machine is in place in the casing, the casing be lifted, the flexibility of the felt base-piece 74 allows the machine slightly to settle in its casing until the shoulders 165 at the rear feet of the machine come to rest upon the top edge of the brackets 160, and until the lower edges 166 of the side plates of the machine come to rest in the bottom of the slots 164 in the front plate of the casing-body. Thereupon the metal framework of the casing relieves the base-piece 74 of the weight of the machine, and the casing, with the machine in position within the same, may be moved as a unit from place to place.

It will be noted that the offset or overhang 167 at the left-hand side of the casing-body, see Figure 2, is greater than the offset or overhang 168 at the right-hand side of the casing-body. This excess of overhang or space at the left-hand side of the casing-body is to allow for the throw of a clutch such as is used in the Underwood typewriting machine to release the platen from the line-space mechanism. This clutch, otherwise known as the fractional line-space-clutch, in the Underwood typewriting machine is concentric with the axis of the platen, and is shiftable longitudinally outward to the left in the releasing operation.

Variations may be resorted to within the scope of the invention, and portions of the improvements may be used without others.

Having thus described my invention, I claim:

1. A typewriting machine in combination with a sound-deadening casing therefor comprising; an interior chamber for the carriage, of such length that the carriage may travel therein on the machine between its extreme positions; carriage-release means including a lever swingable about a vertical pivot on said carriage; a front for the casing slotted horizontally and longitudinally of the casing, for movement therealong of the carriage-release-lever with the carriage, said slot having a locally yielding cushion seal, and the release-lever extending forwardly from its pivot to said casing and protruding through said slot to the outside of the casing, and being freely operable longitudinally of said slot to release the carriage, and a hand-hold on said carriage and extending forwardly therefrom to said casing and protruding forwardly alongside of said release-lever so that both may be engaged between the thumb and forefinger.

2. A typewriting machine in combination with a sound-deadening casing therefor comprising; an interior chamber for the carriage, of such length that the carriage may travel therein on the machine between its extreme positions; carriage-release means including a lever swingable about a vertical pivot on said carriage; a front for the casing slotted horizontally and longitudinally of the casing, for movement therealong of the carriage-release-lever with the carriage, said slot having a locally yielding cushion seal, and the release-lever extending forwardly from its pivot to said casing and protruding through said slot to the outside of the casing, and being freely operable longitudinally of said slot to release the carriage, and a hand-hold on said carriage and extending forwardly thereform to said casing and protruding forwardly alongside of said release-lever so that both may be engaged between the thumb and forefinger, said typewriting machine having a front bar along which said carriage travels, and said lever and hand-hold extending from said carriage downwardly in front of said bar and then forwardly through said slot.

3. A typewriting machine in combination with a sound-deadening casing therefor comprising; an interior chamber for the carriage, of such length that the carriage may travel therein on the machine between its extreme positions; carriage-release means including a lever swingable about a vertical pivot on said carriage; a front for the casing slotted horizontally and longitudinally of the casing, for movement therealong of the carriage-release-lever with the carriage, said slot having a locally yielding cushion seal, and the release-lever extending forwardly from its pivot to said casing and protruding through said slot to the outside of the casing, and being freely operable longitudinally of said slot to release the carriage, a hand-hold on said carriage and extending forwardly therefrom to said casing and protruding forwardly alongside of said release-lever so that both may be engaged between the thumb and forefinger, a rack on the carriage; means engageable with the rack to control the carriage; an arm for disengaging the rack from its controlling means; and a yoke on the protruding release-lever for operative engagement with said rack-disengaging arm.

4. In a combined typewriting machine and sound-subduing longitudinally slotted casing; a carriage within the casing; means for releasing the same, comprising; a lever wholly within the casing and pivoted to swing up and down; and a lever which extends from the carriage to the slot in the casing and through the slot to the exterior thereof, and which is freely operable longitudinally of said slot to operate the first lever; and a carriage-return-arm to which said horizontally operable lever is pivoted, said arm protruding through said slot and co-operative with said lever.

5. In a typewriting machine; a carriage; means for releasing the same, comprising; a lever pivoted to swing up and down; and a lever which is operable in a horizontal plane to operate the first lever; and a carriage-return-arm to which said horizontally operable lever is pivoted, the carriage-return-arm being rigidly secured to the carriage; and the horizontally operable lever and carriage-return-arm protruding forward of the carriage, adjacent each other, so that both may be engaged between the thumb and forefinger.

6. A typewriting machine in combination with a sound-deadening casing therefor comprising; an interior chamber for the carriage, of such length that the carriage may travel therein on the machine between its extreme positions; a carriage-release-lever; a front for the casing slotted horizontally and longitudinally of the casing, for movement therealong of the carriage-release-lever with the carriage, the release-lever protruding through said slot to the outside of the casing, and being operable horizontally to release the carriage; and a carriage-return-arm projecting through said slot adjacent the carriage-release-lever, so that the protruding end of both may be engaged between the thumb and forefinger.

7. A typewriter machine in combination with a sound-deadening casing therefor comprising; an interior chamber for the carriage, of such length that the carriage may travel therein on the machine between its extreme positions; said casing having a slot therein; and a carriage-controlling device extending forwardly from said carriage through said slot and including an arm fixed on said carriage to return the latter, a pivoted finger-piece, and a releasing device on the carriage operable by said finger-piece, said arm and finger-piece extending through said slot side by side, said arm being engageable by the thumb, and the finger-piece being engageable by the forefinger; the carriage being returnable by pressure on said arm in one direction and said carriage being releasable by pressure upon said finger-piece, in the opposite direction, whereby upon grasping said controlling device between the thumb and finger the carriage may be adjusted rapidly to and fro under control and accurately located where desired.

8. A sound-deadening casing for a typewriting machine, having a bottom or base-piece of yieldable sound-deadening material as a unitary part thereof, and normally ineffective means upon said casing and independent of said base-piece, for supporting the typewriting machine when the casing is lifted.

9. A sound-deadening casing for a typewriting machine, having, as a unitary part thereof, a bottom or base-piece of felt or like flexible sound-deadening material on which the machine rests when the casing is on a table or the like; and means, effective only when the casing is lifted, for supporting the typewriting machine from the casing independently of said base-piece; the latter being yieldable to permit the typewriting machine to settle upon said supporting means.

10. A combined typewriting machine and sound-subduing casing therefor, said casing having a body and a top hinged at the rear upon said body, said body comprising a permanent front wall having an opening through which the keyboard of the typewriter projects forwardly, said typewriting machine having a carriage and said carriage having a handle projecting forwardly over the front of said casing-body, said front wall underlying said forwardly-projecting handle, rendering it impossible to set the casing down upon the machine, said top opening to an extent and said casing of dimensions to permit the insertion of the machine keyboard first down into said casing and forwardly through said keyboard-opening, said front wall also having a permanent cross-bar below said keyboard and contributing to the rigidity of the casing body, said bottom cross-bar having a closure of sound-deadening material extending up within the typewriter-framework.

11. A casing for a typewriting machine, having rigid walls surrounding the machine, a bottom of yieldable material secured on the lower edges of said walls, and on which the machine rests during typing, and rests on said walls for supporting the machine to keep it from dropping out of the bottom of the casing when the casing is lifted with the machine in normal position, said rests serving to locate the machine in the casing.

12. A sound-deadening casing for a typewriting machine having a movable cover; a front having an opening therein through which the keyboard of the machine projects; said opening in the front being permanently closed over the keyboard; and a sound-deadening plate attached to the front plate of the machine to close the space between the top of the keyboard and the top of the opening through which the keyboard protrudes when the machine is in place in the casing.

13. In a typewriting machine; type-bars set side by side in arcuate formation; a front plate having an arcuate cut therein to expose the types; and a sound-deadening plate removably attached to the frame of the typewriting machine to close said arcuate cut in the front plate.

14. In a typewriting machine; type-bars set side by side in arcuate formation; a front plate having an arcuate cut therein to expose the types; and a sound-deadening plate removably attached to the frame of the typewriting machine to close said arcuate cut in the front plate; said removable plate having a sound-deadening lining of felt or other suitable material tapered at the edge thereof to provide clearance for the type-bars.

15. A typewriting machine in combination with a sound-deadening casing therefor comprising; a frame for the casing; means supported by the casing frame for holding the front plate of the machine against the inside of the casing front plate, the casing front plate having an opening therein through which the keyboard section of the machine protrudes to the outside of the casing; and a sound-deadening plate removably attachable to the front plate of the machine for closing the opening in the front plate of the casing over the keyboard section of the machine when the machine is in position.

16. A typewriting machine in combination with a sound-deadening casing therefor comprising; a frame for the casing; means supported by the casing frame for holding the front plate of the machine against the inside of the casing front plate; the casing front plate having an opening therein through which the keyboard section of the machine protrudes to the outside of the casing; type-bars set side by side in arcuate formation in the machine; the front plate of the machine having an arcuate cut therein to expose the types; and a sound-deadening plate removably attached to the machine frame to close said arcuate cut; said removable plate serving also to close the opening in the casing front plate over the keyboard section of the machine when the machine is in position.

17. A typewriting machine in combination with a sound-deadening casing therefor comprising; an interior chamber for the carriage, of such length that the carriage may travel therein on the machine between the extreme positions; a carriage-release-lever; and a front for the casing slotted horizontally and longitudinally of the casing, for movement therealong of the carriage-release-lever with the carriage, the release-lever protruding through said slot to the outside of the casing, and being operable horizontally to release the carriage; a rack on the carriage; means engageable with the rack to drive and hold the carriage; an arm having a finger-piece thereon for disengaging the rack from its driving means; and a connection from said rack-disengaging arm to the protruding release-lever; said protruding release-lever being removable when the casing is not to be used.

18. In a sound-deadening casing for a typewriting machine, a machine-receiving body-part and a cover comprising side walls, a sheet-metal part curved over from the rear and downwardly and forwardly to form a ceiling, a transparent pane set in said ceiling to enable the carriage to be viewed, and a lining of sound-deadening material in sheet-form, a seat for the transparent pane being formed by bending the sheet-metal at the edges of the corresponding opening back along the ceiling and then inwardly to engage the edges of the pane, the sheet-metal at the sides of the seat being turned laterally parallel to the ceiling to provide a channel to receive the edges of the sound-deadening material extending along the ceiling at each side of the transparent pane.

19. In a sound-deadening casing for a typewriting machine, a sheet-metal cover comprising a transparent pane in an opening in the sheet-metal, and a lining of sound-deadening material in sheet-form, the sheet-metal at the edges of the opening extending back along the inside surface and then inwardly to provide flanges to engage the edges of the transparent pane, the metal at the inner edges of certain of the flanges being turned away from the opening parallel to the inner surface of the cover to provide a channel to receive the adjacent edges of the sound-deadening material.

20. In combination, a typewriting machine, a casing therefor, the machine having a front wall with an arcuate opening to expose the types, the casing having a front wall with an opening to give access to the types, and a detachable plate which may be inserted between said front walls when the casing is in position around said machine.

21. In combination, a typewriting machine, a casing therefor, the machine having a front wall with an arcuate opening to expose the types, the casing having a front wall with an opening to give access to the types, a detachable plate which may be inserted between the front walls when the casing is in position around said machine, and devices to locate said plate in its effective or closing position.

GEORGE W. CAMPBELL.